E. M. VAN HOESEN & N. H. BROWN.

Car-Coupling.

No. 7,922. Reissued Oct. 23, 1877.

Witnesses

Richard L. Gardiner

Harry Smith

Inventors

Eugene M. Van Hoesen and

Nelson H. Brown by their Attorneys

Howson & Sons

UNITED STATES PATENT OFFICE.

EUGENE M. VAN HOESEN AND NELSON H. BROWN, OF SYRACUSE, N. Y.

IMPROVEMENT IN CAR-COUPLINGS.

Specification forming part of Letters Patent No. 119,431, dated September 26, 1871; Reissue No. 7,922, dated October 23, 1877; application filed August 25, 1877.

*To all whom it may concern:*

Be it known that we, EUGENE M. VAN HOESEN and NELSON H. BROWN, of Syracuse, in the county of Onondaga and State of New York, have invented a new and Improved Car-Coupling; and we do hereby declare that the following is a full, clear, and exact description thereof, which will enable others skilled in the art to make and use the same, reference being had to the accompanying drawings, forming part of this specification.

Figure 1:
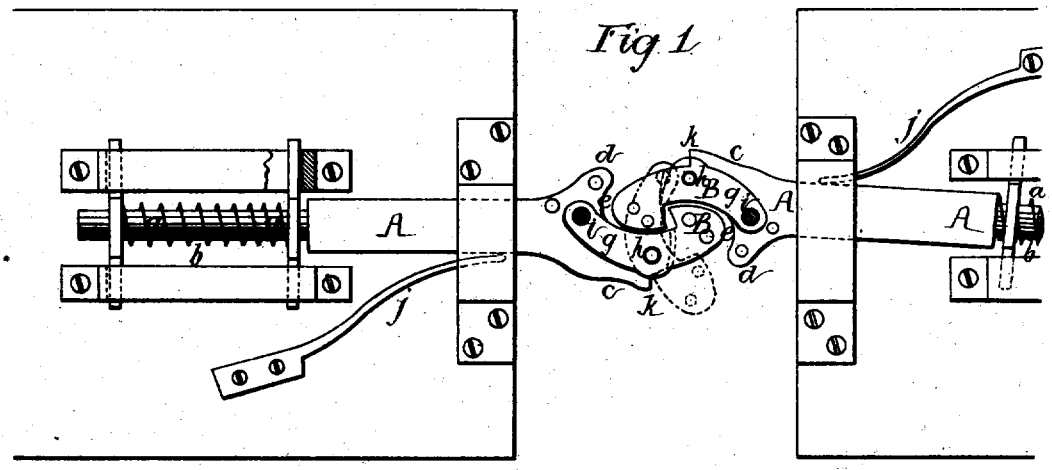
Figure 2:
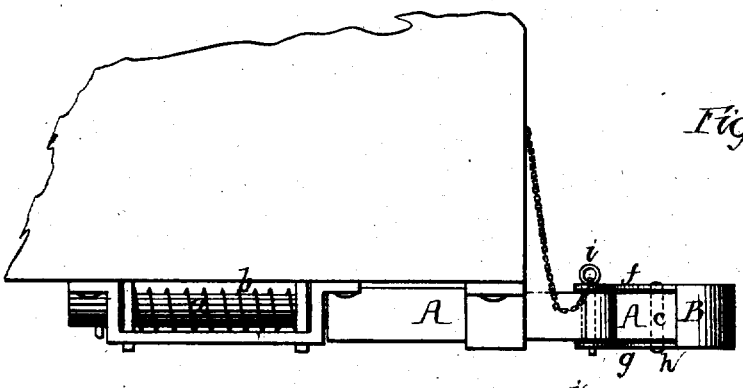
Figure 3:
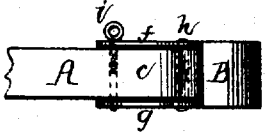

Figure 1 represents an inverted plan or bottom view, partly in section, of our improved car-coupling. Fig. 2 is an inner side view of the same. Fig. 3 is an outer side view of the same.

Similar letters of reference indicate corresponding parts.

The invention consists in the application of a peculiar swing-head to the end of the buffer and draft-bar, the swing-head being the connecting means, as hereinafter more fully described.

A, in the drawings, represents the draw-head and buffer of the coupling. The shank *a* is connected with a spring, *b*, in such manner as to be yielding both to pressure and tension—that is to say, to constitute a yielding buffer as well as draw-head. Its outer end is made as with two fingers, *c* and *d*, between which a cavity, *e*, formed.

To the outer end of the longer finger *c* is pivoted the swinging head B, with top and bottom plates *f* and *g*, which overlap the upper and lower faces of the said finger *c*. The pivot-pin *h* pierces the plates *f* and *g* and the finger *c*, near the end of the latter.

A pin, *i*, is fitted through the plates *f g* and the draw-head A, in order to lock the swing-head to the latter.

The heads will interlock whether the pins *i* are inserted or not. Thus, if the pins are inserted, when two couplings meet they will strike at the points of the swing-heads, and crowd each other aside until they are interlocked, in the manner shown in Fig. 1. Springs *j*, bearing against the sides of the draw-heads, cause them to thus interlock and be held together.

The cars can be conveniently uncoupled by withdrawing one of the pins *i*, which will release one swing-head and allow it to move, so that its hook will become disengaged from that of the adjacent coupling.

Upon the meeting of two cars, in the coupling of either or both of which the pin *i* is removed and the head allowed to swing free, the meeting will cause the projecting hooked arm of one coupling-head to strike the inner arm of the other head, and thus cause the hooked portions of the heads to interlock, and the loose head or heads to come into position for receiving the pin *i*.

The hooked end of the swing-head B may be mortised to admit an ordinary coupling-link, which can be retained by a pin. Cars having our improved coupling can thus be connected with cars having other coupling.

A projecting shoulder, *k*, is formed at the outer side of the draw-head finger *c*, to prevent the swing-head, when loose, from swinging around farther than is required for the position of self-coupling. (See dotted lines in Fig. 1.)

The recess or cavity *e* serves as a bumper, to resist the longitudinal thrust of the head B of the adjoining coupling.

The swing-head may be widened by putting extra pieces to either side of it.

Having thus described our invention, we claim as new, and desire to secure by Letters Patent—

1. A car-coupling in which a draw-head or bumper is combined with a swinging head having two arms, one of which is hooked, and the other adapted, when the head is free, to be struck by the hooked arm of an adjacent coupler, so as to cause the interlocking of the two hooks.

2. The combination of a draw-head or bumper, a swinging head having two arms, as described, and a retaining-pin for locking said head when coupled.

3. The combination of a swinging head having two arms, as described, with a draw-head or bumper having a stop, *k*.

4. The combination of a swinging head having a hook with a draw-head or bumper capable of moving laterally under control of a spring.

In testimony whereof we have signed our names to this specification in the presence of two subscribing witnesses.

E. M. VAN HOESEN.
N. H. BROWN.

Witnesses:
W. H. GIFFORD,
E. C. WRIGHT.